United States Patent [15] 3,688,881
Kinney [45] Sept. 5, 1972

[54] MECHANICAL CLUTCH-BRAKE
[72] Inventor: John F. Kinney, South Bend, Ind.
[73] Assignee: The Bendix Corporation
[22] Filed: Sept. 30, 1970
[21] Appl. No.: 76,888

[52] U.S. Cl. ................................. 192/8 R, 188/134
[51] Int. Cl. .................................................. F16d 67/00
[58] Field of Search .................. 188/134; 192/8 R, 16

[56] References Cited

UNITED STATES PATENTS

| | | | |
|---|---|---|---|
| 1,170,216 | 2/1916 | Blanch | 192/8 R |
| 2,052,094 | 8/1936 | Huff | 192/8 R |
| 2,359,010 | 9/1944 | Smith | 192/8 R |
| 3,335,831 | 8/1967 | Kalns | 192/8 R |

Primary Examiner—Duane A. Reger
Attorney—Gordon H. Chenez and Plante, Hartz, Smith and Thompson

[57] ABSTRACT

A rotatable driven member having a bifurcated end portion defining spaced apart radially inwardly flexible end portions provided with friction surfaces engageable with a friction surface of a fixed member. A rotatable driving member is provided with an end portion which meshes with the spaced apart end portions of the driven member. The driven member is held fixed by the fixed member until a predetermined torque load is applied by the driving member against the space apart end portions of the driven member which flexes radially inwardly to reduce or release the frictional force holding the friction surfaces thereof against the fixed friction surface depending upon the output torque imposed on the driven member.

8 Claims, 5 Drawing Figures

PATENTED SEP 5 1972

INVENTOR.
JOHN F. KINNEY
BY
Gordon H. Chenez
AGENT

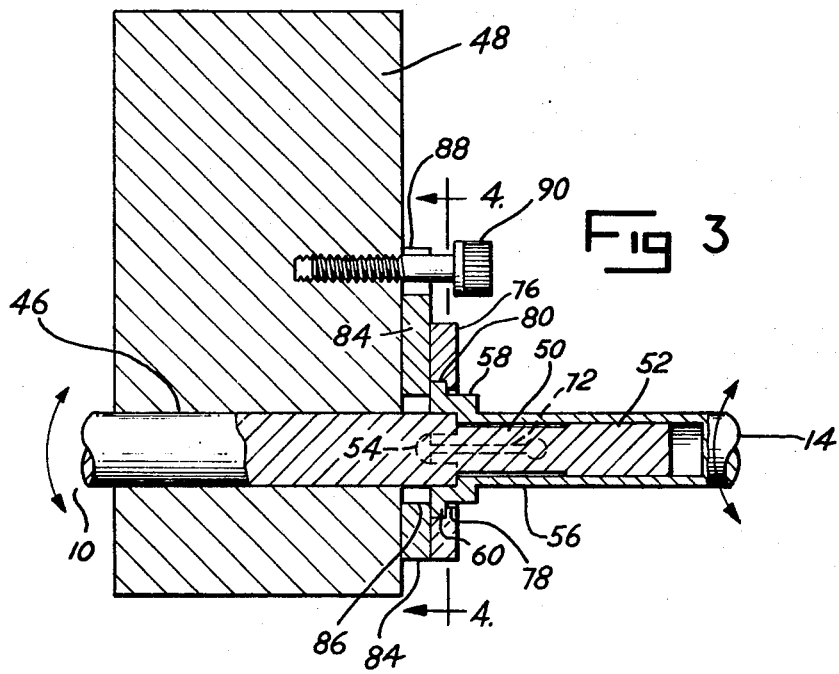
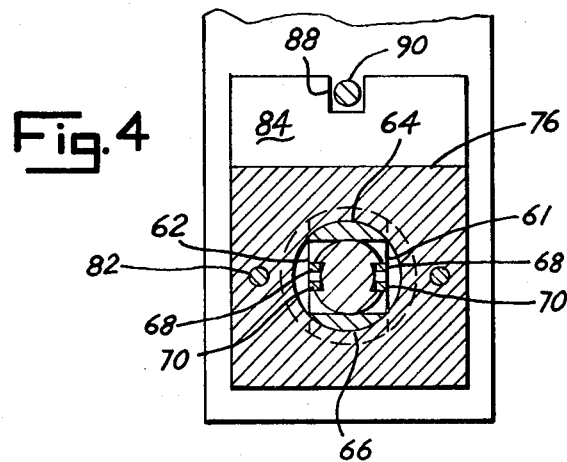
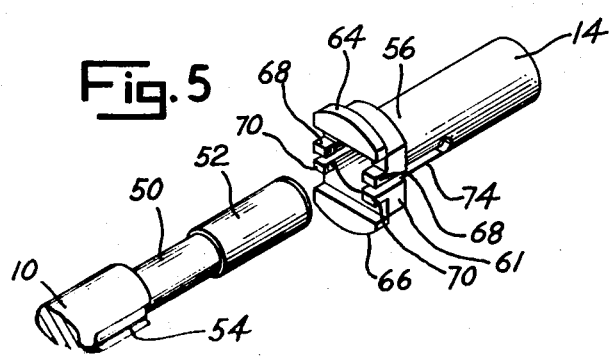
INVENTOR.
JOHN F. KINNEY
BY
Gordon H. Chavez
AGENT

MECHANICAL CLUTCH-BRAKE

BACKGROUND OF THE INVENTION

The present invention pertains to a clutch-brake device adapted for use with rotatable driving and driven members wherein a predetermined driving torque acts to disengage the brake mechanism to provide "drive through" action and wherein driving torque may be maintained at a constant level regardless of driven or feedback torque by clutching action of the brake.

Various forms of prior art devices for controlling rotational movement of a rotatable member in response to torque imposed thereon have been proposed. However, such prior art devices of which I am aware are not entirely satisfactory, particularly in the case of control apparatus wherein movement of an element must be accurately and reliably controlled in response to relatively small torque levels. The unsatisfactory nature of the prior art devices may be attributed to one or more things such as undesirable weight, size, complexity and/or maintenance, and calibration and assembly difficulties.

It is an object of the present invention to provide a simple and reliable clutch-brake mechanism for controlling rotation of a rotatable member in response to predetermined torque conditions imposed thereon.

It is another object of the present invention to provide simple and accurate clutch-brake mechanism adapted for coupling rotatable driving and driven members wherein brake action is released by driving torque to provide "drive through" operation and the driving torque level maintained constant regardless of driving or feedback torque by clutching action of the brake.

It is an important object of the present invention to provide a simple clutch-brake mechanism particularly adapted for use in controlling rotation of driving and driven rotatable members in response to relatively small torque levels imposed thereon.

Other objects and advantages will be apparent from the following description taken with the accompanying drawings.

BRIEF DESCRIPTION OF THE DRAWING

FIG. 3 represents a schematic view in section of a second embodiment of the present invention;
FIG. 4 represents a view taken on line 4—4 of FIG. 3;
FIG. 5 represents an exploded view of a portion of the apparatus of FIG. 3.

DESCRIPTION OF THE PREFERRED EMBODIMENTS

Figure 1:
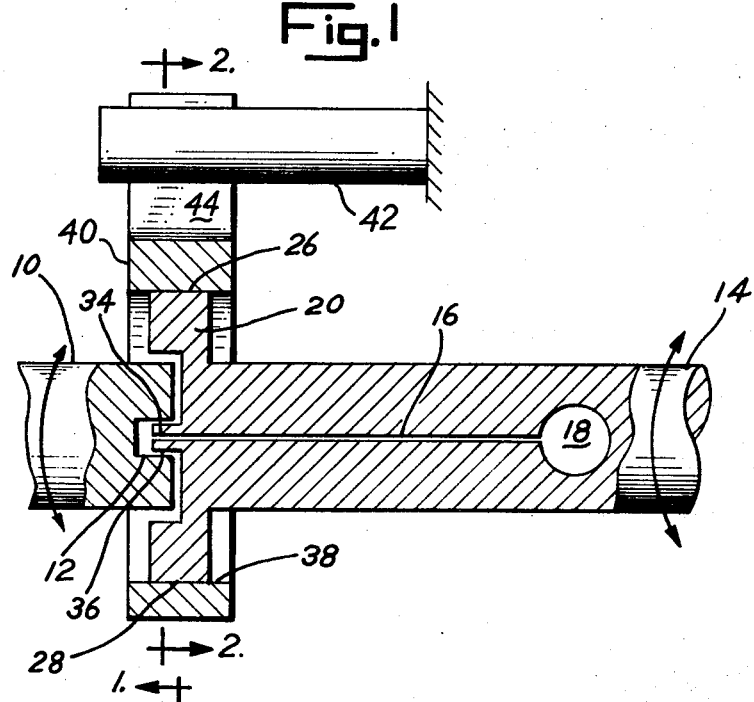
FIG. 1 represents a schematic view in partial section of the present invention.
Figure 2:
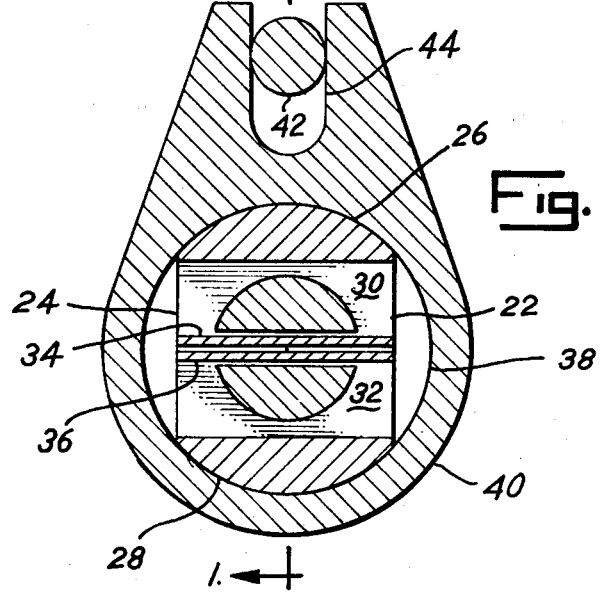
FIG. 2 represents a view taken on line 2—2 of FIG. 1.

Referring to FIGS. 1 and 2, numeral 10 designates a rotatable input shaft which, for example, may be driven by control apparatus such as an electric motor, not shown, having a variable output torque. The end of shaft 10 is provided with a transverse slot 12.

A rotatable output shaft 14 is suitably connected at one end to a controlled member, not shown, which is responsive to torque imposed on shaft 14 as will be described. The opposite end of shaft 14 is provided with a transverse slot 16 extending axially therethrough and terminating in a diametrical opening or bore 18. The slotted end of shaft 14 is provided with an enlarged diameter portion 20 having diametrically opposite sections thereof cut away to define flat walls 22 and 24 and arcuate friction surfaces 26 and 28 separated thereby. The enlarged diameter portion 20 is transversely recessed as at 30 and 32 to define lugs 34 and 36 which are separated by slot 16 perpendicular to walls 22 and 24. The end of shaft 10 is received by recesses 30 and 32 to permit lugs 34 and 36 to slidably mesh with slot 12.

The arcuate friction surfaces 26 and 28 engage a circular friction surface 38 defined by the inner wall of a drum 40 surrounding enlarged diameter portion 20. The drum 40 is prevented from rotating by suitable fixed anchor means such as rod 42 which slidably engages a slot 44 in drum 40. The slot 44 permits a limited range of movement of drum 40 relative to rod 42 depending upon the length of slot 44 for alignment purposes of shafts 10 and 14.

Referring to FIGS. 3, 4 and 5, the second embodiment of the present invention shown therein provides for positive alignment of the driving and driven shafts thereof. The driving shaft 10 is rotatably carried in a bore 46 in a fixed support 48 through which the shaft 10 extends. The shaft 10 is provided with a reduced diameter end portion having a first section 50 and a relatively larger diameter section 52. Diametrically opposed recesses 54, one of which is shown in FIG. 5, are formed in shaft 10.

The driven shaft 14 is provided with a tubular end portion 56 having an enlarged diameter section 58 and a relatively larger diameter section 60 which are cut away, thereby establishing diametrically opposite walls 61 and 62 and diametrically opposite arcuate friction surfaces 64 and 66. The larger diameter section 60 is transversely recessed to define diametrically spaced apart pairs of spaced apart lugs 68 and 70. The tubular end portion 56 is slotted transversely to define axially extending slots 72 and 74 which separate associated pairs of lugs 68 and 70 thereby providing flexible support for the lugs 68 and 70 as well as the associated arcuate friction surfaces 64 and 66 integral therewith as will be described.

The driven shaft 14 is frictionally engaged by a drum 76 having a central opening 78 through which the enlarged diameter section 58 extends and an annular recess 80 which receives the larger diameter section 60 defining friction surfaces 64 and 66. The drum 76 is fixedly secured by suitable fastening means such as screws 82 to a plate 84 having an opening 86 through which the driving shaft 10 extends. The rotational 84 is provided with a slot 88 through which a bolt 90 extends into threaded engagement with fixed support 48. It will be noted that the bolt 90 prevents rotational movement of plate 84 but permits a limited range of movement thereof away from fixed support 48 by virtue of the spaced relationship of the head of bolt 90 which engages plate 84.

As shown in FIG. 3, the larger diameter section 52 of shaft 10 is slidably received by the tubular end portion 56 to the extent that the lugs 68 and 70 slide into associated recesses 54 thereby establishing a driving connection rotationally between shafts 10 and 14.

The operation of the two embodiments shown in FIGS. 1 and 3 is essentially identical with the exception of the self aligning feature provided by the embodiment of FIG. 3. It will be noted that the shafts 10 and 14 of FIG. 3 are axially aligned as a result of the larger diameter section 61 telescoping within tubular end portion 56 whereas in FIG. 1 such is not the case.

Referring to FIGS. 1 and 2, the arcuate friction surfaces 26 and 28 are urged radially outwardly into engagement with friction surface 38, thereby fixing the position of shaft 14. Torque application upon the input shaft 10 results in engagement thereof with lugs 34 and 36 which are compressed radially inwardly thereby reducing the frictional load of arcuate friction surfaces 26 and 28 against friction surface 38 as a result of the spring action of shaft 14. If the feedback or load torque imposed on the driven shaft 14 is sufficiently high, the input shaft 10 will compress lugs 34 and 36 to the extent that the radially directed load urging arcuate friction surfaces 26 and 28 against friction surface 38 and thus frictional effort therebetween is eliminated. In the event that no feedback or load torque is imposed on driven shaft 14, the lugs 34 and 36 will be compressed by shaft 10 to the extent only that the frictional load derived from the spring action of shaft 14 is reduced to permit rotation of shafts 10 and 14 resulting in clutching action which is a direct function of torque level.

The torque load required to overcome the frictional loading derived from the spring action of shaft 14 will vary depending upon the relationship of the radii of the frictional surface 38 and point of contact of shaft 10 with lugs 34 and 36 relative to the axis of rotation of the same. Thus, the braking or clutching effect between arcuate surfaces 26 and 28 and surface 38 can be amplified as desired.

Referring to FIGS. 3, 4 and 5, it will be recognized that the spring action of slotted tubular end portion 56 corresponds to that of the slotted shaft 14 of FIG. 1. Rotation of shaft 10 in response to an applied torque causes the shaft 10 via recesses 54 to engage a lug 68 of one pair of lugs and lug 70 of the other pair of lugs, depending upon the direction of rotation of shaft 10, thereby compressing the same radially inwardly to overcome the spring action of tubular end portion 52 and reduce or eliminate the frictional load imposed on the arcuate surfaces 64 and 66 as is the case of FIG. 1.

Alignment of shafts 10 and 14 is assured by the end 52 which is slidably received by the tubular end portion 56. A limited amount of axial play of the shafts 10 and 14 is provided for by the plate 84 which is free to slide along bolt 90 until contact with the head thereof is established.

I claim:

1. A clutch-brake device comprising:
    a rotatable driving member;
    a rotatable driven member having a bifurcated end portion defining spaced apart flexible first and second arms provided with first and second friction surfaces, respectively;
    a braking member fixed against rotation thereof and engageable with said first and second friction surfaces to restrict movement of same;
    said rotatable driving member being operatively connected to said first and second arms to impose a driving torque load thereon tending to flex said first and second arms and disengage said first and second friction surfaces from said braking member to a variable degree dependent upon the torque load to be overcome by said driven member to permit rotation thereof.

2. A clutch-brake device as claimed in claim 1 wherein:
    said driving member includes a transverse slot;
    said first and second arms of said driven member including lug portions slidably engageable with said transverse slot.

3. A clutch-brake device as claimed in claim 2 wherein:
    said first and second friction surfaces are defined by arcuate portions spaced radially outwardly from said lug portions.

4. A clutch-brake device as claimed in claim 3 wherein:
    said braking member is a circular drum concentric with and encircling said arcuate portions.

5. A clutch-brake device as claimed in claim 2 wherein:
    said driving member is a circular shaft and said transverse slot extends diametrically across an end thereof.

6. A clutch-brake device as claimed in claim 1 wherein:
    said first and second arms are defined by a tubular section having an enlarged diameter end and axially extending, diametrically opposite, slots formed in the wall of said tubular section;
    said enlarged diameter end having diametrically opposite flat wall portions formed thereon extending perpendicular to said slots to form arcuate portions defining said first and second friction surfaces;
    said braking member includes a fixed circular drum concentric with and surrounding said arcuate portions.

7. A clutch-brake device as claimed in claim 6 wherein:
    said driving member is a shaft slidably received by said tubular section and provided with a reduced diameter portion permitting radially inwardly flexing of said first and second arms immediately adjacent thereto.

8. A clutch-brake device as claimed in claim 6 wherein:
    said drum is provided with an annular recess adapted to receive said arcuate portions and frictionally engage the radially outermost surface of said arcuate portions;
    a fixed member operatively connected to said drum for restricting rotation thereof and slidably engageable therewith to permit a predetermined range of axial movement of said drum relative to said fixed member.

* * * * *